United States Patent [19]

Maier

[11] 3,942,894

[45] Mar. 9, 1976

[54] SELF REFERENCING RETRANSMITTING ALIGNMENT SENSOR FOR A COLLIMATED LIGHT BEAM

[75] Inventor: Dennis A. Maier, Albuquerque, N. Mex.

[73] Assignee: The United States of America as represented by the Secretary of the Air Force, Washington, D.C.

[22] Filed: Nov. 20, 1974

[21] Appl. No.: 525,594

[52] U.S. Cl. .................................. 356/153; 356/138
[51] Int. Cl.² ...................... G01B 11/26; G01C 1/00
[58] Field of Search ..................... 356/153, 152, 138

[56] References Cited
UNITED STATES PATENTS
3,518,005  6/1970  Weber ................................. 356/138

Primary Examiner—Robert Segal
Attorney, Agent, or Firm—Joseph E. Rusz; Willard R. Matthews, Jr.

[57] ABSTRACT

The alignment of a collimated light beam is monitored by diverting a sample portion of the beam through an auxiliary optical light beam transmission system which converts the sample portion into an annular collimated light beam and transmits it coaxially with the main beam. The annular beam is reflected back through its transmission system by a fixed reference annular mirror that permits the passage of the main beam through its aperture. The retransmitted annular beam is divided to sensors that detect its angular misalignment and lateral displacement as a true measure of main beam alignment relative to the fixed reference annular mirror. End to end main beam alignment is accomplished by servo controlled optical elements that respond to the outputs of these sensors and to the outputs of sensors that measure alignment of the main beam input.

3 Claims, 2 Drawing Figures

SELF REFERENCING RETRANSMITTING ALIGNMENT SENSOR FOR A COLLIMATED LIGHT BEAM

BACKGROUND OF THE INVENTION

This invention relates to light beam transmission systems, and in particular to apparatus for monitoring and maintaining the alignment of a collimated light beam relative to a fixed reference member.

Optical systems frequently require precise alignment of the light beams being transmitted relative to optical elements and fixed reference members. This is especially true of laser systems. It is also often necessary to continuously monitor and dynamically align such beams. For example, it is required in certain applications to dynamically maintain the alignment of a collimated laser beam relative to a telescope through which the beam is being projected. Alignment procedures currently in use are usually time consuming and lacking in precision. State-of-the-art beam alignment sensor systems generally employ a separate autocollimator light source. Significant errors are introduced into such a system when the main beam projected by the system passes through a dispersing media. Errors occur due to the difference in wavelength content of the two beams. There presently exists therefore, the need for light beam alignment monitoring and manipulating procedures and apparatus that are less time consuming and more precise than currently available means. The present invention is directed toward satisfying this and other needs.

SUMMARY OF THE INVENTION

The beam alignment sensor of the present invention comprises apparatus for measuring and/or maintaining the alignment of a collimated beam of light relative to a fixed reference surface. The system obtains a sample (from a beam splitter, grating or other such element) of the collimated beam. The angular and linear displacements of this beam relative to the alignment system are measured with the appropriate sensors. A portion of the sample beam is retransmitted along the same path (for instance, in a larger diameter annular segment) as the main beam. This retransmitting section of the system acts as an autocollimator by receiving as well as transmitting a portion of the sampled beam. The return is provided by a flat reference surface which is mirrored. This mirrored surface may be an annular mirror through which the main beam passes but from which the retransmitted autocollimated beam is reflected. The angular and linear alignments of the retransmitted beam are sensed from the auto-reflected return from the mirrored surface relative to which the beam alignment is to be sensed. By using the output signals of the input beam sensor to reorient mirrors or optical elements prior to the alignment system and by using the output signals of the autocollimating section to reorient mirrors or optical elements after the alignment sensor, absolute alignment of the light beam relative to the reference surface can be maintained.

It is a principal object of the invention to provide a new and improved collimated light beam alignment sensor.

It is another object of the invention to provide a self-referencing retransmitting light beam alignment sensor that is more precise than currently available alignment systems.

It is another object of the invention to provide an alignment system capable of maintaining and dynamically aligning a collimated light beam with a high degree of precision.

It is another object of the invention to provide a self-referencing light beam alignment sensor that is not adversely affected when the light beam is passed through a dispersive media.

These, together with other objects, advantages and features of the invention will become more readily apparent from the following detailed description when taken in conjunction with the illustrative embodiments in the accompanying drawings.

DETAILED DESCRIPTION OF THE PREFERRED EMBODIMENT

The beam alignment sensor comprehended by the invention is used to measure the angular alignment and linear displacement of a collimated beam of light relative to a fixed reference surface. The new and unique feature of this system is that a portion of the beam itself is utilized as the source for an autocollimating alignment sensor. By using a sampled portion of the beam as a source, as opposed to a separate autocollimator light source, the output signal from the autocollimator is a measure of not just the misalignment of any of the optical elements between the autocollimator and the retroreflecting reference surface, but is a measure of the true alignment of the main collimated beam relative to this reference surface. By using a portion of the main beam as a source for the autocollimator, the alignment system is simplified and wavelength dependence of the alignment (for example, if the beam is passed through a dispersive media) is best compensated.

Figure 1:
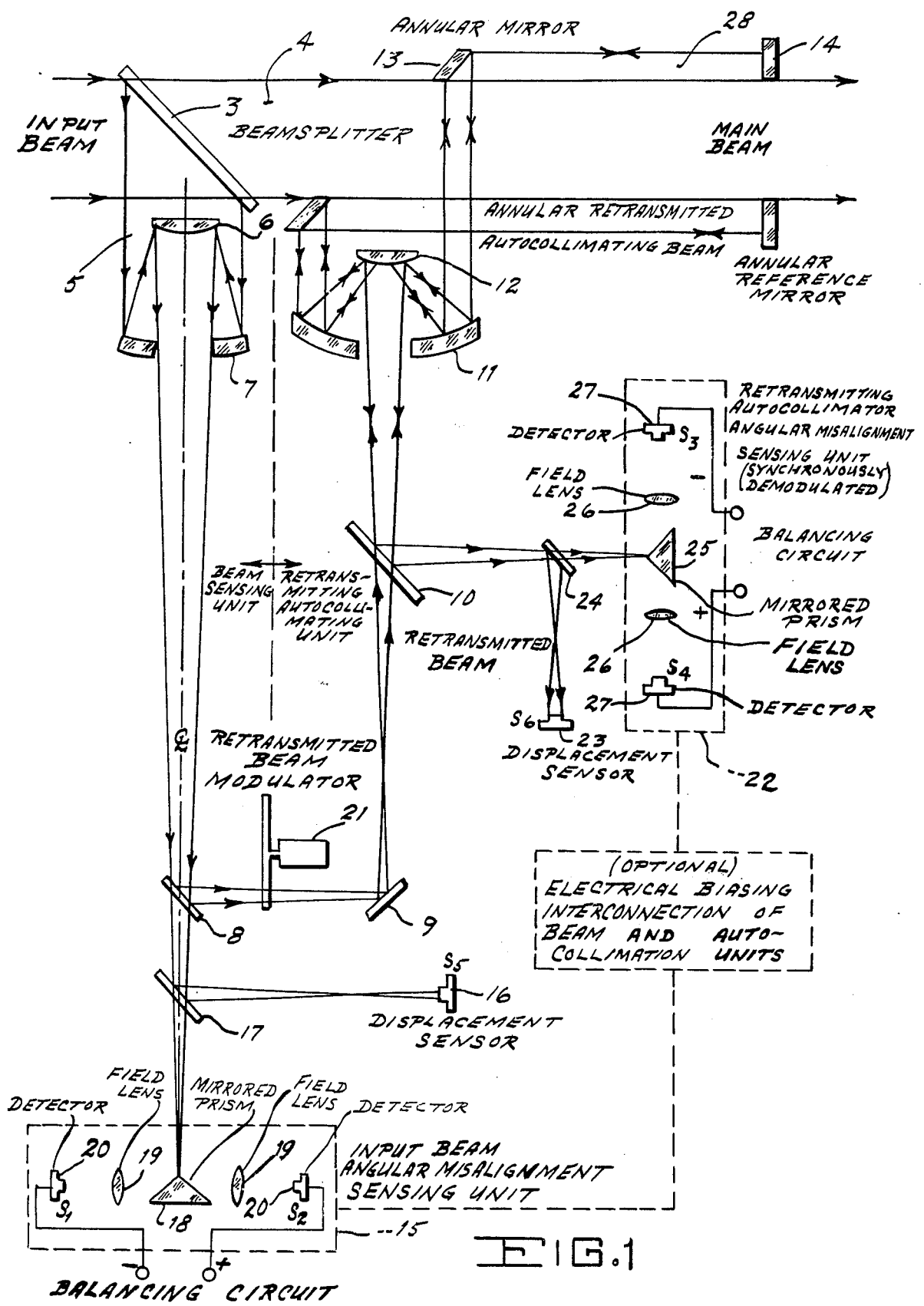
FIG. 1 is a diagrammatic representation of the basic alignment sensor of the invention.

The following description of the basic alignment sensor is presented having particular reference to the diagrammatic representation shown in FIG. 1 of the drawings. Although FIG. 1 illustrates a complete embodiment of the alignment sensor, various alternative system configurations and uses can be employed without departing from the basic concepts of the invention.

Referring now to FIG. 1, beamsplitter 3 in intercepting relationship with main beam 4 diverts a sample portion 5 thereof into an auxiliary beam transmission system. This system comprises focusing optics 6, 7, beamsplitter 8, reflecting corner mirror 9, beamsplitter 10, beam folding optics 11, 12, and annular mirrors 13 and 14. Annular mirror 14 is also the fixed reference member with which main beam 4 is aligned. The sample portion 5 of the main beam is focused on angular misalignment sensing unit 15 by focusing optics 6, 7, and also onto lateral displacement sensor 16 through beamsplitter 17. Angular misalignment sensing unit 15 consists of mirrored prism 18, field lens 19, detector 20 (including two additional detectors normal to the plane of the drawing) and a conventional balancing circuit. The beam transmitted through the auxiliary beam transmission system via beamsplitter 8 is modulated by modulator 21. The beam transmitted back through the auxiliary beam transmission system is diverted by means of beamsplitter 10 to the retransmitting autocollimator angular misalignment sensing unit 22 and to lateral displacement sensor 23 through beamsplitter 24. Angular misalignment sensing unit 22 consists of mirrored prism 25, field lens 26, detector elements 27 and a conventional balancing circuit.

Operation of the alignment sensor of FIG. 1 is now considered. The angular alignment and linear displacement of main collimated light beam 5 relative to fixed reference surface mirror 14 is to be measured. The alignment sensor is properly oriented initially in relation to mirror 14. The collimated beam is then projected through the sensor unit. A portion 5 of the beam is redirected into the sensor unit by beamsplitter 3. This beam sample is focused by an optical system, represented by optic elements 6, 7. A portion of this sample is redirected by beamsplitter 8 into the retransmitting autocollimating portion of the system. The autocollimating unit is described in detail below. The part of the sampled beam which passes through beamsplitter 8 is again divided by beamsplitter 17 into displacement sensor 16 and angular alignment sensor 15. Displacement sensor 16 is placed such that it is in an optically conjugate (image) plane of some plane in the input beam. By masking the center of a quadrant detector to the exact diameter of the image, the amount and direction of beam displacement can be sensed. The angular alignment sensor illustrated utilizes a mirrored pyramidal prism and four detectors (detectors which would be into and out of the paper are not shown). This unit gives error signals which are proportional to the beam angular tilt relative to the axis of the sensor. Rotation of the beam about two orthogonal axes which are orthogonal to the axis of the alignment system is measured. FIG. 1 illustrates the rays of light incident on the nose of the pyramidal prism or the null condition for the sensor. If the beam enters the alignment system with its axis inclined to the nominal axis, more light will fall on one sensor, for instance, $S_1$, than on the other, $S_2$. An imbalance of the sensor outputs is a measure of the amount of angular beam misalignment. These methods of sensing angular misalignment and linear displacement are commonly used and are certainly not the only techniques for such sensing. The degree of accuracy achievable in either in angular or linear sensor is a function of the specific optical system and detecting components used.

The retransmitting autocollimating portion of the alignment sensor is now considered. As indicated above, a portion of the sampled beam is directed by beamsplitter 8 into the autocollimating unit. This part of the beam sample is amplitude modulated in a periodic manner by means of a rotating chopper wheel, electrooptical modulator, or other such method. The beam is then folded by mirror 12 onto the axis of the collimating optics, mirrors 11 and 12. If the incoming beam is tilted or displaced relative to the axis of the beam sensing unit, the retransmitted portion of the beam will be tilted or displaced relative to the collimator optical axis 7. The beam passes through beamsplitter 10 and is collimated and retransmitted. The collimating optics produce an annular ring of collimated light 28 with the inside diameter of the annulus slightly larger than the outside diameter of the main beams. This annular light is directed along the same axis as main beam 4 by means of an annular mirror 13 which has a hole in the center to allow the main beam to pass through. The annular beam 28 travels through the optical system along the same path as the main beam, using the periphery of any optical elements. When it reaches the mirrored reference surface 14, the annulus of light is reflected back along the same path (if the beam is aligned to be perpendicular to mirror 14) back into the collimating optics. If the collimated beam strikes the reference mirror at other than normal incidence, the beam will be misaligned as it returns to the alignment sensor. This return beam is focused by the collimating optics. A portion of the returning light is diverted by beamsplitter 10 into the autocollimator sensing units 22, 23. The angular alignment and linear displacement sensors of the autocollimating unit function in the same manner as those sensors in the beam sensing unit with the exception that demodulating circuitry is included. This demodulating circuitry is synchronized with the retransmitted beam modulator. In this way, the detector noise which would result from any main beam energy reaching the autocollimating sensing units is effectively reduced.

The unique self-referencing feature of the alignment system is illustrated by the following examples. It is pointed out that the objective of the system is to measure and/or maintain the two axis angular alignment and the linear displacement of a beam relative to a fixed reference surface.

In the first instance, the alignment sensor is fixed in angular and linear relationship to the source of collimated light. In this case the beam sensor will always produce the same error signal, which can be adjusted to be zero. Any angular or linear misorientation of the reference surface (relative to the alignment sensor) will be sensed by the autocollimating sensing unit. Since the actual axis of the autocollimating unit is identical to that of the beam (this alignment is accomplished during assembly), the autocollimating unit is measuring the misalignment of the beam relative to the reference surface.

The same type of consideration is true if the alignment sensing system is fixed relative to the reference mirror. The sensing system can be initially aligned with the reference mirror such that the beam sensor unit and the autocollimating unit will produce error signals which are a direct measure of beam misalignment relative to the reference surface.

A fixed relationship of the alignment sensor to either the beam or the reference surface is not necessary for this system to measure the relative angular alignment. The beam axis and the axis of the retransmitted annular beam will be angularly aligned regardless of the alignment of the main beam relative to the system axis (within field of view limits). If a biasing circuit is connected between the beam sensing unit and autocollimating unit, the autocollimating unit will measure the relative angular alignment of the beam to the reference surface even though the beam and reference surfaces are not aligned relative to the alignment system axis or to each other.

Figure 2:
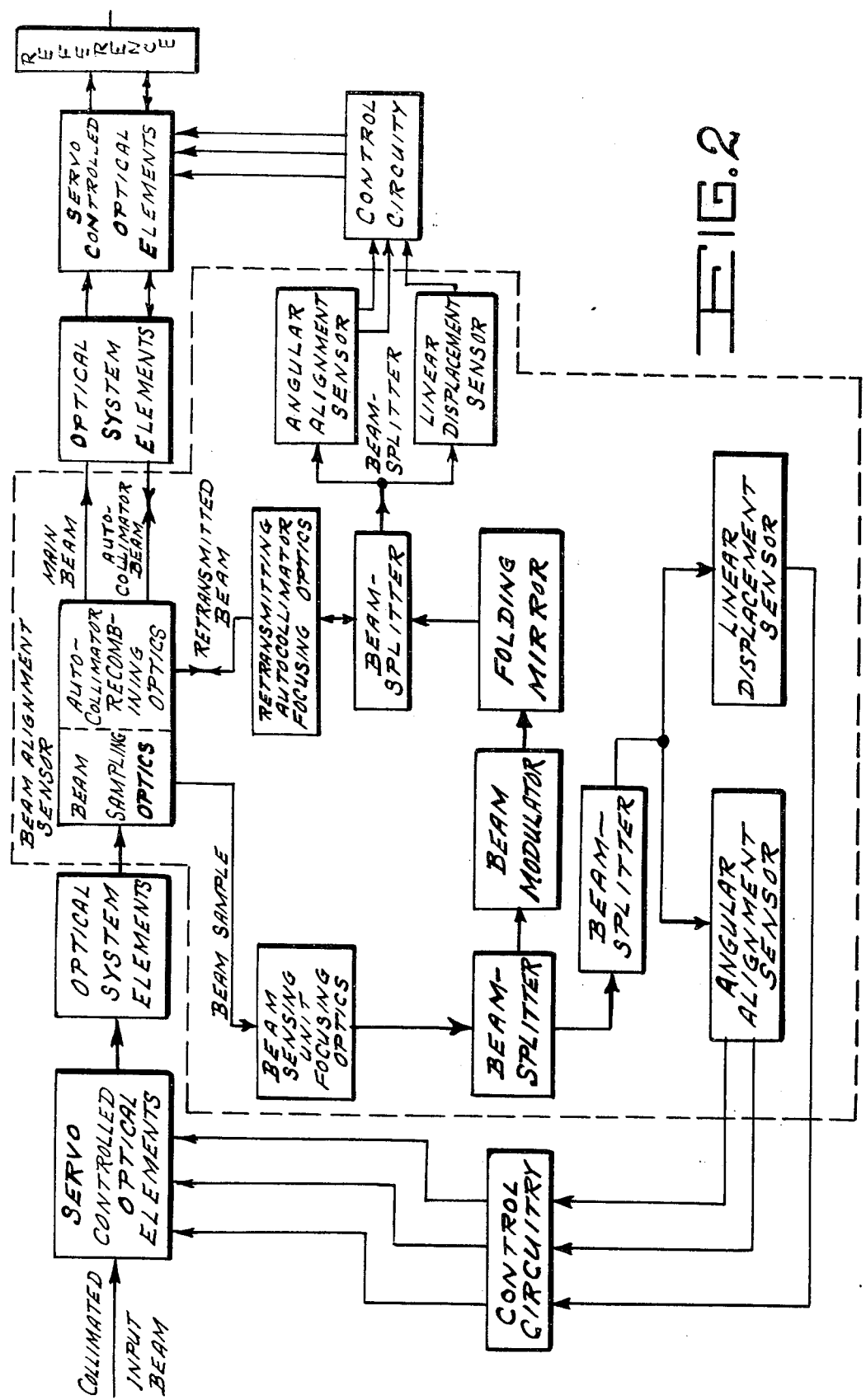
FIG. 2 is a block diagram of the alignment sensor of FIG. 1 incorporated in a dynamic alignment system.

The beam alignment sensor is most advantageously employed as an integral part of a dynamic alignment system. An example of such an application is illustrated in FIG. 2. In this example the alignment sensing system output is used to physically reorient optical elements (using drivers or actuators on the elements themselves) to dynamically maintain the alignment of the beam to the reference surface. In this configuration, both sensing units will be brought to null by the feedback loop to the driven elements. The initial alignment of the alignment sensor to the beam reference surface axis is, with limits, not critical. The beam sensing unit will cause the main beam to be aligned relative to the axis of the alignment sensor. The autocollimating unit will cause the reference surface, as viewed by the beam, to be aligned relative to the axis of the alignment sensor. Since the beam and reference surfaces are both aligned to the alignment system axis, they will be aligned relative to each other. Alignment is thus made relative to the alignment sensing system. If any elements in the entire optical path of the main beam bend light in a wavelength dependent manner, this will have a minimal effect on the system since the main beam and the autocollimating beam are of the same wavelength content.

While the invention has been described in its preferred embodiment, it is understood that the words which have been used are words of description rather than words of limitation and that changes within the purview of the appended claims may be made without departing from the scope and spirit of the invention in its broader aspects.

What is claimed is:

1. Apparatus for monitoring the alignment of a collimated light beam comprising
   an auxiliary light beam transmission system,
   means for diverting a sample portion of said collimated light beam through said auxiliary light beam transmission system,
   said auxiliary light beam transmission system having optical elements arranged to convert said sample portion of collimated light beam into an annular collimated beam and to transmit said annular collimated beam in proximate coaxial peripheral relationship with said collimated light beam,
   an apertured reference mirror positioned to permit the passage of said collimated light beam through its aperture and to reflect said annular collimated light beam back through said auxiliary light beam transmission system,
   a first light beam angular alignment sensing means,
   a first light beam lateral displacement sensing means, and
   means for diverting the reflected annular collimated light beam onto said first light beam angular alignment sensing means and onto said first light beam lateral displacement sensing means.

2. Apparatus for monitoring the alignment of a collimated light beam as defined in claim 1 including means for modulating said diverted sample portion of collimated light beam and means for demodulating the outputs of said first light beam angular alignment sensor and said first light beam lateral displacement sensor.

3. Apparatus for monitoring the alignment of a collimated light beam as defined in claim 2 including a second light beam angular alignment sensor, a second light beam lateral displacement sensor, and means for focusing said diverted sample portion of collimated light beam thereon.

* * * * *